(12) United States Patent
Monrocq et al.

(10) Patent No.: US 8,229,661 B2
(45) Date of Patent: Jul. 24, 2012

(54) HYBRID INERTIAL SYSTEM WITH NON-LINEAR BEHAVIOUR AND ASSOCIATED METHOD OF HYBRIDIZATION BY MULTI-HYPOTHESIS FILTERING

(75) Inventors: Stephane Monrocq, Valence (FR); Sébastien Juillaguet, Bourg de Peage (FR)

(73) Assignee: Thales, Neuilly sur Seine (FR)

( * ) Notice: Subject to any disclaimer, the term of this patent is extended or adjusted under 35 U.S.C. 154(b) by 300 days.

(21) Appl. No.: 12/756,005

(22) Filed: Apr. 7, 2010

(65) Prior Publication Data

US 2010/0256906 A1    Oct. 7, 2010

(30) Foreign Application Priority Data

Apr. 7, 2009   (FR) ...................... 09 01700

(51) Int. Cl.
*G01C 21/00* (2006.01)
(52) U.S. Cl. ........................................................ 701/220
(58) Field of Classification Search .................. 701/220
See application file for complete search history.

(56) References Cited

U.S. PATENT DOCUMENTS

2006/0106533 A1   5/2006   Hirokawa

FOREIGN PATENT DOCUMENTS

| EP | 1862764 A1 | 12/2007 |
|---|---|---|
| EP | 2026037 A2 | 2/2009 |
| WO | WO 00/73815 | 12/2000 |
| WO | WO2009/052473 | 4/2009 |

OTHER PUBLICATIONS

French Search Report from the French Patent Office for French Application No. 0901700 dated Dec. 10, 2009.

*Primary Examiner* — Jack W Keith
*Assistant Examiner* — Maceeh Anwari
(74) *Attorney, Agent, or Firm* — Stroock & Stroock & Lavan LLP

(57)   ABSTRACT

Hybrid inertial system onboard a mobile carrier comprising an inertial measurements unit, at least one platform for integrating inertial data, at least one exterior sensor and a multi-hypothesis hybridization filter, the said system being characterized in that the said hybridization filter implements at least the following steps:

an initialization step performing the generation of a plurality of state vectors an update step executing, for each of the said state vectors, the phase of readjusting an extended Kalman filtering a propagation step executing, for each of the said state vectors, the phase of propagation of an extended Kalman filtering a step of determining the likelihood $q^i_t$ of the said updated state vector a step of calculating inertial corrections.

18 Claims, 5 Drawing Sheets

HYBRID INERTIAL SYSTEM WITH NON-LINEAR BEHAVIOUR AND ASSOCIATED METHOD OF HYBRIDIZATION BY MULTI-HYPOTHESIS FILTERING

CROSS-REFERENCE TO PRIOR APPLICATIONS

Priority is claimed to French Patent Application No. 0901700, filed on Apr. 7, 2009, which is hereby incorporated by reference in its entirety.

BACKGROUND OF THE INVENTION

1. Field of the Invention

The subject of the present invention is a method of hybridization of an inertial system by multi-hypothesis filtering as well as the associated hybrid inertial system. It applies notably within the framework of inertial systems, an aim of which is to determine the location and the navigation of a moving object, for example an aircraft. These systems comprise at least one inertial measurements unit whose outputs can have non-linear behaviours as well as a set of exterior sensors producing instantaneous measurements characterizing the location and/or the navigation of the said moving object. An application of such a system is, for example, the navigation of an aircraft.

2. Description of the Prior Art

An inertial measurement unit is traditionally composed of several inertial sensors which deliver one or more measurements describing the motion of the moving object. An inertial sensor can be a gyrometer which delivers a measurement of the angular speed of the moving object or an accelerometer which delivers a measurement of the acceleration of the moving object. These measurements may be marred by errors that will subsequently be called inertial defects and may, moreover, have a non-linear behaviour. For example, amplitude steps may be observed in the said measurements provided by the inertial sensor. These steps, or more generally, these non-linearities may be due to operating imperfections of the sensors, to high sensitivity to changes of temperature, to vibrations or else to the impact of abrupt changes of the motion profile of the moving object. One of the aims of the present invention is to implement a method for hybridizing an inertial system by instantaneous measurements of one or more components characteristic of the location and/or of the navigation of the moving object and provided by a set of external sensors.

Moreover, the invention proposes a solution which makes it possible to take into account the non-linear behaviour of the defects of the inertial sensors and is based on the use of a multi-hypothesis filter making it possible to identify these defects and ultimately to accurately correct the errors impacting the estimation of the location and of the navigation of the moving object. The multi-hypothesis filter according to the invention is notably based on the principle of making several hypotheses about the defects of the inertial sensors and then of determining which is the most likely.

The hybridization of inertial systems with other external sensors is traditionally carried out on the basis of extended Kalman filtering known by the abbreviation EKF (Extended Kalman Filter). This robust scheme is commonly used for numerous applications, notably for hybridizations performed with the aid of pressure sensors, magnetometers, satellite-based positioning systems, or else radioaltimeters. However, the proper operation of the extended Kalman filter relies on two hypotheses: the linearity of the propagation of its states and of its observations as well as the hypothesis that all noise affecting the system follows a Gaussian distribution. In particular, when the measurements provided by the inertial sensors do not have a linear behaviour, the extended Kalman filter is not suitable or remains largely sub-optimal.

International patent application WO00/73815 proposes a solution making it possible to alleviate the non-linearities of the defects of inertial sensors. This scheme is based on the use of neural networks and does not rely in any way on the principles of the extended Kalman filter. Moreover this application claims an inertial system using solely external sensors of GNSS type.

SUMMARY OF THE INVENTION

The present invention proposes a solution using in part the principles of extended Kalman filtering but adapting it to a multi-hypothesis filtering making it possible to take into account and to correctly estimate the non-linear behaviour of the defects of the inertial sensors.

For this purpose the subject of the invention is a hybrid inertial system onboard a mobile carrier comprising an inertial measurements unit delivering angle variation measurements $\Delta\theta$ and/or speed variation measurements $\Delta V$, at least one platform for integrating inertial data receiving the angle variation measurements $\Delta\theta$ and/or the speed variation measurements $\Delta V$ and producing instantaneous measurements of the location and/or of the navigation of the said mobile carrier, at least one exterior sensor delivering observation measurements of the location and/or of the navigation of the said mobile carrier and a multi-hypothesis hybridization filter receiving the said instantaneous measurements and the said observation measurements and delivering corrections to the platforms for integrating inertial data which deliver a hybrid estimation of the location and/or of the navigation of the said mobile carrier, the said system being characterized in that the said multi-hypothesis hybridization filter implements at least the following steps:

- an initialization step performing the generation of a plurality of state vectors $XP^i_0$ representative of the state of the said inertial system comprising on the one hand at least one state dedicated to the location and/or to the navigation of the said mobile carrier and on the other hand hypotheses about defects of the inertial measurements unit,
- an update step executing, for each of the said state vectors, the phase of readjusting an extended Kalman filtering and producing as output an updated state vector $XE^i_t$ and its associated covariance matrix $PE^i_t$,
- a propagation step executing, for each of the said state vectors, the phase of propagation of an extended Kalman filtering and producing as output a propagated state vector $XP^i_t$, its associated covariance matrix $PP^i_t$, and their associated likelihood $q^i_t$,
- a step of determining the likelihood $q^i_t$ of the said updated state vector $XE^i_t$ as a function of the comparison between the observations data and the propagated state vector,
- a corrections calculation step receiving the plurality of propagated state vectors $XP^i_t$, their associated covariance matrices $PP^i_t$ and their associated likelihood $q^i_t$ and producing the said inertial corrections of the errors of position and of motion of the said mobile carrier, the said corrections being delivered to the platforms for integrating inertial data.

In a variant embodiment of the invention the likelihood $q^i_t$ of the state vector $XE^i_t$ is determined as a function of the comparison between the vector $Z_t$ of observations data and the propagated state vector $XP_{t-1}^i$ with the aid of the following relation: $q_t^i = P_{e(t)}(Z_t - H \cdot XP_{t-1}^i)$, where H is an observation matrix defined with the aid of an extended Kalman filtering and $p_{e(t)}(\ )$ is a Gaussian probability function given by the following relation:

$$p_{e(t)}(Z_t - H \cdot XP_{t-1}^i) = \left(\frac{1}{2\pi}\right)^{N/2} \frac{1}{\sqrt{|R_t|}} \exp\left(-\frac{1}{2}[Z_t - H \cdot XP_{t-1}^i]^T R_t^{-1}[Z_t - H \cdot XP_{t-1}^i]\right),$$

where $R_t$ is the standard deviation of the vector $Z_t$.

In a variant embodiment of the invention the likelihood $q_t^i$ obtained is filtered with the aid of a low-pass filter.

In a variant embodiment of the invention the said multi-hypothesis hybridization filter furthermore implements a step of updating the particles in the course of which the said hypotheses about defects of the inertial measurements unit determined during the initialization phase are adjusted as a function of an a priori knowledge of the behaviour of the said inertial measurements unit, the adjustments possibly being the deletion of one or more hypotheses and/or the generation of one or more new hypotheses.

In a variant embodiment of the invention the said system moreover comprises means for implementing a step of calculating corrections of the observations data of the exterior sensors.

In a variant embodiment of the invention the said exterior sensor is one of the following sensors or a combination of these sensors: a satellite navigation system, a magnetometer, a baroaltimeter, a radioaltimeter, an odometer, a DME receiver, a VOR receiver, a TACAN receiver, a radar or an anemometric set.

In a variant embodiment of the invention the said corrections calculation step implements the sum of the corrections obtained on the basis of each state vector hypothesis, each correction being weighted by the likelihood $q_t^i$ of the corresponding state vector.

In a variant embodiment of the invention the said hybrid inertial system comprises an integration platform for each state vector hypothesis, the said corrections calculation step delivers an independent correction to each integration platform and the said hybrid inertial system furthermore comprises a step of calculating filtering outputs which receives the set of hybrid estimations delivered by each of the integration platforms and calculates the sum thereof weighted by each of the associated likelihoods $q_t^i$ so as to produce a single hybrid estimation.

In a variant embodiment of the invention the said hybrid inertial system implements a so-called open-loop architecture and the said corrections are added directly to the hybrid estimation of the location and navigation data of the said mobile carrier.

The subject of the invention is also a method of hybridization by multi-hypothesis filtering of an inertial system, characterized in that it comprises means for implementing the hybridization of an inertial system such as described above.

BRIEF DESCRIPTION OF THE DRAWINGS

Other characteristics and advantages of the present invention will be more apparent on reading the description which follows in relation with the appended drawings which represent.

MORE DETAILED DESCRIPTION

Figure 1:
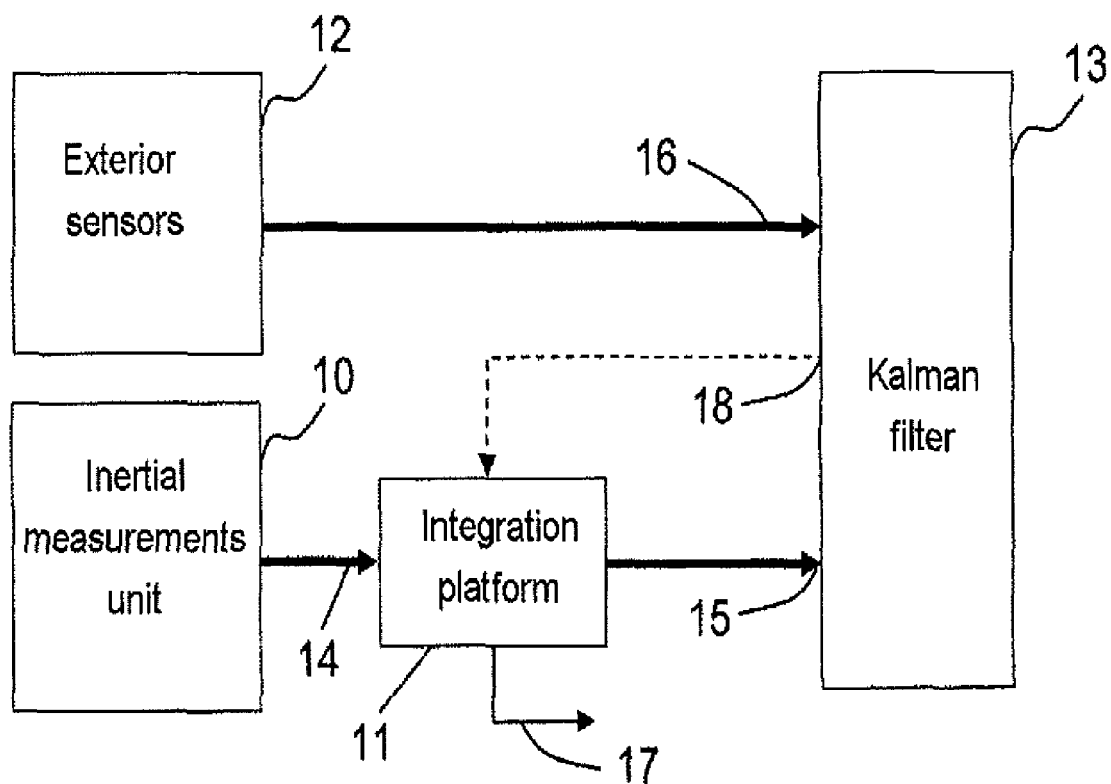
FIG. 1, a schematic of a hybrid inertial system implementing an extended Kalman filter, FIG. 2, a schematic of a hybrid inertial system implementing a multi-hypothesis filter according to the invention, FIG. 3, a schematic of a variant of the hybrid inertial system according to the invention using several platforms for integrating inertial data, FIGS. 4a, 4b and 4c, several examples of the results obtained with the aid of the hybridization method according to the invention and the improvement with respect to the state of the art.

FIG. 1 shows diagrammatically a hybrid inertial system onboard a moving object, for example an aircraft, implementing in order to perform this hybridization an extended Kalman filter. This system comprises an inertial measurements unit 10 which delivers at its output one or more measurements 14 corresponding to the motion of the moving object, for example its acceleration and/or its angular speed. The inertial measurements unit 10 comprises several inertial sensors which may be, for example, accelerometers and/or gyrometers. In a typical case of use, three accelerometers and three gyrometers are considered, each of the three being placed in an orthogonal trihedron. The inertial system also comprises an inertial data integration platform 11the function of which is to integrate the inertial measurements 14 so as to determine a set of instantaneous measurements 15 that are characteristic of the position and/or of the motion of the moving object. These measurements 15 typically correspond to the position, the speed and the attitude of the moving object. The said measurements 15 may be marred by errors due to the imperfections of the inertial sensors, this is why it is known to hybridize these inertial data by way of exterior sensors 12. These sensors provide data which form observations 16 characteristic of the position and/or of the motion of the moving object. The observation data 16 are for example measurements of the position and of the speed of the moving object as provided by a satellite-based positioning system. The observation data 16 can also include a value of the standard deviation associated with the said measurements. The objective of the hybridization is to improve the estimation of the location and navigation data of the moving object. Accordingly, the observations data 16 and the inertial measurements 15 are processed jointly by an extended Kalman filter 13 which produces a set of corrections. These corrections can be corrections of defect of the inertial sensors and/or corrections of location and navigation of the moving object. The corrections 18 can be fed back as input to the integration platform 11 of the inertial data according to a so-called closed-loop mechanism. The integration platform 11 produces, subsequent to the correction 18, an improved estimation of the hybrid data 15,17. In a similar mechanism, but operating in open loop, the location and navigation corrections are applied directly to the hybrid data 15,17.

Extended Kalman filtering 13 is a commonly used method within the framework of hybridizations of inertial systems. Its behaviour is recursive and principally exhibits two phases. A first phase of so-called propagation of the states which serves to describe the propagation of the modelled states which are typically the location, the navigation or the inertial defects. The model used is commonly called an errors model since the states in fact correspond to the errors in the states which may typically be an error in the position, the speed, the attitude or an error of inertial defects. A second so-called update phase performs a correction of the states on the basis of observations provided by external sensors. In this regard, it is useful to define a certain number of variables which come into play in the implementation of this filter. In the subsequent description, $XE_t$ will denote the state vector obtained at the instant t containing the values of the states arising from the phase of update of the extended Kalman filtering and $XP_t$ will denote the propagated state vector obtained at the instant t and containing the values of the states arising from the phase of propagation of the same filter. The method implemented by the extended Kalman filtering is recursive, this signifying that the propagated state vector $XP_{t-1}$ obtained at the instant t−1 is used to perform the update of the state vector $XE_t$ at the instant t.

By way of reminder, the equations, known to the Person skilled in the art, illustrating the two phases of the extended Kalman filtering are specified here.

The phase of readjusting the state vector $XE_t$ at the instant t can be modelled with the aid of the following known relations:

$$XE_t = XP_{t-1} + K_t * Y_t \quad (1)$$

where $K_t$ is the gain of the Kalman filter, $Y_t$ is the innovation vector calculated on the basis of the vector $Z_t$ of the observations data 16, of the propagated state vector at the instant t−1 and of the observation matrix H according to the following relation:

$$Y_t = Z_t - H * XP_{t-1} \quad (2)$$

The observation matrix H is a parameter commonly used during the implementation of extended Kalman filtering, it serves to project the state vector into a space allowing comparison with the observation vector $Z_t$.

The phase of update of the extended Kalman filtering also implements, by way of an algorithm known to the Person skilled in the art, the calculation of the covariance matrix $PE_t$ associated with the state vector $XE_t$ on the basis of the covariance $PP_{t-1}$ of the propagated state vector $XP_{t-1}$.

The propagation phase also called the phase of predicting the state vector at the instant t is executed with the aid of the following relation:

$$XP_t = F * XE_t \quad (3)$$

where F is the propagation matrix of the model the calculation of which is known to the Person skilled in the art. Likewise the covariance matrix $PP_t$ of the propagated state vector is also calculated during this phase. The aim of the propagation phase is to estimate the propagation of the state vector $XE_t$ by a prediction of its future state. The propagated state vector $XP_t$ corresponds to an estimation of the state vector at the future instant t+1.

The invention consists notably in implementing a hybridization taking into account the possibility of non-linear propagation of the states of the defects of the inertial sensors, such as for example accelerometric bias or gyrometric drift. Accordingly, the extended Kalman filtering traditionally used in the known solutions is adapted with the aim of performing a filtering using several hypotheses about the defects of the inertial sensors.

In an initialization phase, the method according to the invention consists in defining several state vectors based on several hypotheses about defects of the inertial sensors. A drawing of N particles is therefore performed based on an a priori distribution. Each particle is a vector comprising a hypothesis regarding realization of the non-linear states of the defects of the inertial sensors. For example, if the non-linear states considered are the accelerometric bias and the gyrometric drift, the N particles may be written:

$$P_1 = \begin{Bmatrix} Bias^{(1)} \\ Drift^{(1)} \end{Bmatrix} \ldots P_N = \begin{Bmatrix} Bias^{(N)} \\ Drift^{(N)} \end{Bmatrix},$$

with $Bias^{(i)}$ and $Drift^{(i)}$ the hypotheses taken for the particle of index i of the bias and drift values.

The said hypotheses are determined, for example, by randomly drawing a value from a bounded range of values sampled with a given fixed sampling interval. The range of values is fixed as a function of the a priori knowledge of the ranges of variations of the non-linear states that one seeks to estimate with the aid of the method according to the invention. Each particle thus determined is assigned an initial weight which can take, for example, the value 1/N.

Thereafter, the N state vectors which will serve as input to the filtering method according to the invention are determined by supplementing each particle with the other states considered and which have an assumed linear propagation. These states are advantageously the attitude, the position and the speed of the moving object. The N following state vectors are then obtained, comprising, on the one hand, the hypotheses about the non-linear states and, on the other hand, the measurements characteristic of the position and of the navigation data of the moving object:

$$XP_0^1 = \begin{Bmatrix} Attitude \\ Speed \\ Position \\ \vdots \\ Bias^{(1)} \\ Drift^{(1)} \end{Bmatrix} \ldots XP_0^N = \begin{Bmatrix} Attitude \\ Speed \\ Position \\ \vdots \\ Bias^{(N)} \\ Drift^{(N)} \end{Bmatrix}$$

The composition of these state vectors can be generalized to any type of measurements characteristic of the motion or of the position of a moving object. Likewise the component elements of the particle vectors can be extended to any type of errors in non-linear states arising from measurements of the inertial sensors. It is also possible to extend the use of the particles to non-linear states for error estimation of exterior sensors. The initialization phase described above makes it possible to obtain the initial values of the propagated state vectors $XP_o^i$ of each of the particles i for i lying between 1 and N.

Figure 2:
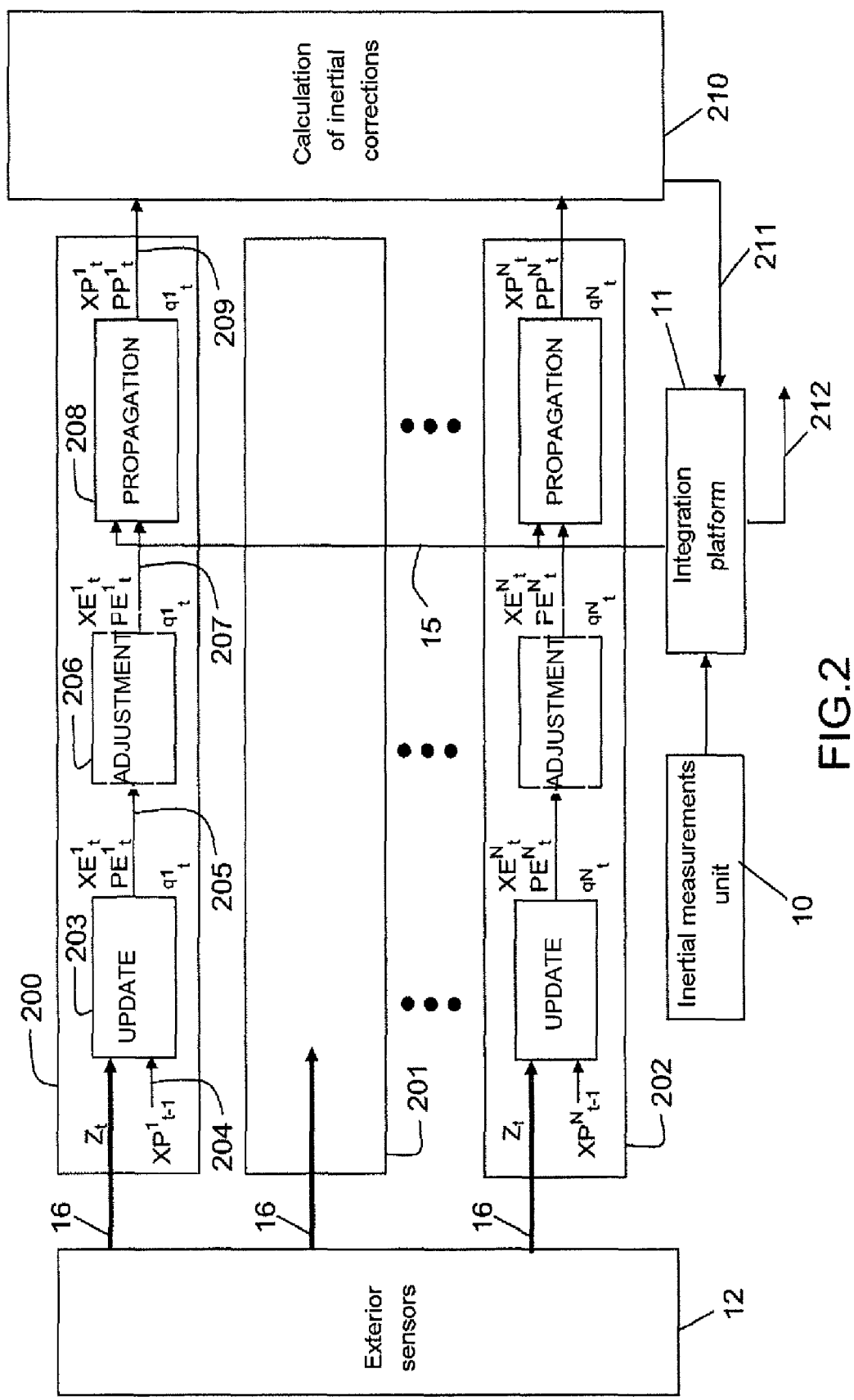

FIG. 2 illustrates a schematic of the functional architecture of an inertial system according to the invention. This hybrid inertial system comprises certain elements common to the system according to the prior art presented in FIG. 1. Notably, found therein is the set 12 of exterior sensors delivering at its output 16 and at an instant t observations data serving for the calculation of the observation vector $Z_t$ used in the hybridization filter. The hybrid inertial system according to the invention also comprises an inertial measurements unit 10 and a platform for integrating these measurements 11 which delivers at its output location and navigation data 15 for the moving object. The hybrid inertial system according to the invention also comprises a set of N multi-hypothesis filtering units 200,201,202 which each carry out a filtering according to the invention of the said navigation data 15 by taking into account the hypothesis introduced by one of the above particles. Each filtering unit 200 executes an update function 203 and a propagation function 208 as well as a function 206 for updating the particles. The processings performed in each of the said filtering units 200,201,202 are identical but apply respectively to each state vector $XP_t^i$.

The update function 203 performs, at the instant t, the update, according to the equations implemented by an extended Kalman filtering such as described above in support of FIG. 1, of the state vector 204 $XP_{t-1}^i$ propagated at the instant t−1 with the knowledge of the observation vector $Z_t$. At the start of the method, the propagated state vector is the state vector $XP_0^i$ obtained on completion of the initialization phase on the basis of the particle of index i. The update function 203 delivers, at its output, the updated state vector $XE_t^i$, its covariance matrix $PE_t^i$, as well as a likelihood $q_t^i$ associated with the said updated state vector.

The calculation according to the invention of the likelihood $q_t^i$ of the state vector $XE_t^i$ consists in determining a relative weight for each hypothesis that engendered the formation of a particle i and then of its associated state vector $XE_t^i$. This weight is commensurate with the likelihood of each errors hypothesis that led to the creation of a particle. The calculation of this likelihood takes into account the observations provided by the exterior sensors, for example, the position and the speed, deduces therefrom the errors with respect to the same measurements arising from the platform for integrating inertial data and performs a comparison of these errors with the hypotheses taken. By taking as hypothesis that the observation vector $Z_t$ is marred by noise which follows a Gaussian distribution and by knowing the standard deviation $R_t$ in these observations, it is possible to determine the likelihood $q_t^i$ of each state vector $XE_t^i$ with the aid, for example, of the following relation:

$$q_t^i = p_{e(t)}(Z_t - H \cdot XP_{t-1}^i) \quad (4)$$

where $p_{e(t)}$ is an estimation of the probability of error performed on the measurements of the observation vector $Z_t$ and can be related to the standard deviation $R_t$ associated with the vector $Z_t$ by the following relation:

$$p_{e(t)}(Z_t - H \cdot XP_{t-1}^j) = \left(\frac{1}{2\pi}\right)^{N/2} \frac{1}{\sqrt{|R_t|}} \left(-\frac{1}{2}[Z_t - H \cdot XP_{t-1}^j]^T R_t^{-1}[Z_t - H \cdot XP_{t-1}^j]\right) \quad (5)$$

Each likelihood obtained is thereafter normalized with respect to the sum of the likelihoods of the set of particles, and this may be expressed with the aid of the following relation:

$$q_t^i = \frac{q_t^i}{\sum_{i=1}^{N} q_t^i} \quad (6)$$

In a variant embodiment, the calculation of the likelihood of a particle can implement a low-pass filtering so as to limit the noise marring the measurements. This filtering can be executed with the aid, for example, of the following relation:

$$q_t^i = q_{t-1}^i \cdot p_{e(t)}(Z_t - H \cdot XP_{t-1}^i)$$

The output 205 of the update function composed of the triple $\{XE_t^1, PE_t^1, q_t^1\}$ is thereafter linked to the input of a particles updating function 206. This function 206 performs notably the initialization phase described above comprising the creation of the N particles and of the N associated state vectors. In the course of the filtering method according to the invention, particles can be deleted or modified as a function of exterior parameters.

A variant of the invention consists notably in eliminating from the method a particle having too low a likelihood, in this case one speaks of degeneracy of the particle. The elimination decision can be based on the comparison of the likelihood with a given threshold. When a particle is eliminated, the method according to the invention continues either with one less particle, or by reinitializing the eliminated particle through the creation of a new particle with the aid of the method described for the initialization phase.

In another variant embodiment, the quantization interval used for the creation of the particles is rendered alterable as a function of information exterior to the method such as for example a priori knowledge of the profile of variation of the inertial measurements in the course of time or a change of environment impacting the motion of the moving object. An update of the particles is also possible by taking the same information into account.

The triple $\{XE_t^1, PE_t^1, (q_t^1)\}$, possibly modified by the adjustment function 206, is thereafter delivered to the input 207 of a propagation function 208. This function also takes as input the navigation data 15 arising from the integration platform 11 and executes the phase of propagation, such as described above, of an extended Kalman filtering with the aid notably of relation (3) and produces at its output 209 a triple containing the propagated state vector at the instant t $XP_t^1$, its covariance matrix $PP_t^1$, as well as the associated likelihood $q_t^1$ which has not been modified in the course of this step. The propagated state vector $XP_t^1$ is thereafter delivered as input 204 to the update function 203 so as to calculate the updated state vector at the instant t+1 $XE_{t+1}^1$ such as described above.

The description given for the filtering unit 200 relating to the particle of index i remains valid for the set of N−1 other filtering units 201,202 relating to the particles of index ranging from 1 to N. The set of filtering units 200,201,202 therefore deliver at their outputs N state vectors $XP_t^i$ and their associated likelihoods. These elements are provided to a unit 210 for calculating the inertial corrections which delivers at its output 211 an inertial corrections vector obtained by calculating the sum of the inertial corrections vectors delivered by each filtering unit 200,201,202, weighted by their respective likelihoods. This vector of inertial corrections 211 is provided to the integration platform 11 which takes account thereof so as to deliver an estimation 212 of the hybrid navigation data.

Figure 3:
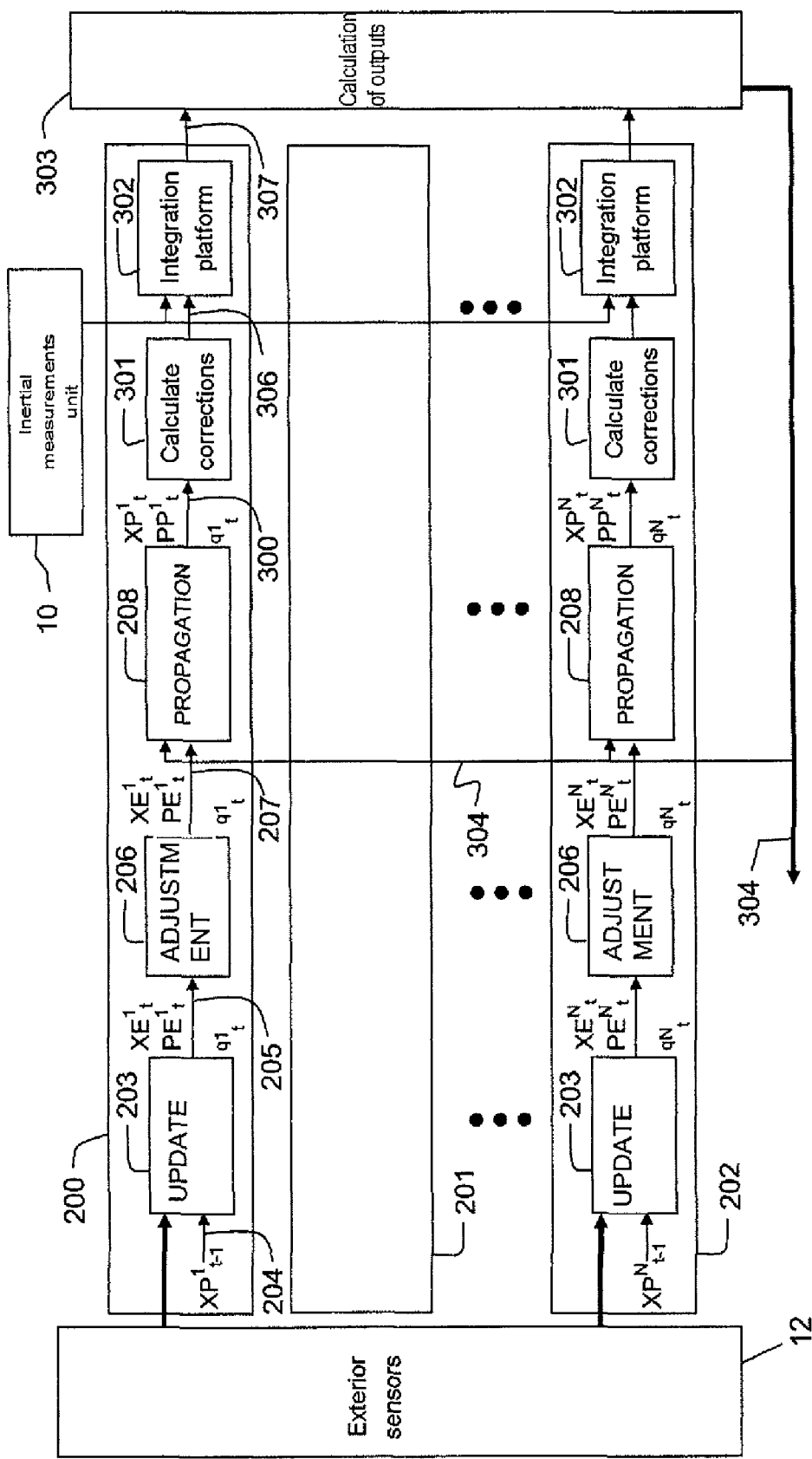

FIG. 3 shows diagrammatically a variant embodiment of the hybrid inertial system according to the invention for which several platforms for integrating the inertial data are used.

The system represented in FIG. 3 differs from the system described above in support of FIG. 2 in that it comprises, for each filtering unit 200,201,202 associated with a particle, a unit 301 for calculating the inertial corrections as well as a platform for integrating the inertial data 302. In this case one speaks of multiplatform systems. Each of the platforms 302 has an input linked to the output of the inertial measurements unit 10 and also receives as input the result 306 of the inertial corrections calculation 301 performed on the basis of the outputs of the propagation functions 208. For each particle hypothesis, the associated integration platform 302 delivers at its output a hybrid estimate 307 of the navigation data and the set of these estimates are processed by a module 303 for final calculation of the outputs of the filtering system. This module 303 performs a combination of the N navigation data vectors by taking into account the likelihoods $q_t^i$ of each of the associated hypotheses. For example the calculation module 303 can calculate the sum of these N vectors weighted by their respective likelihoods so as to produce a unique vector 304 of hybrid estimates of navigation data. This unique vector 304 is provided to the N propagation functions so as to perform a closed-loop filtering.

In a variant embodiment of the invention, the filtering method according to the invention can be performed according to a so-called open-loop architecture. In this case no correction 211,301 is transmitted to the integration platform or platforms. The appropriate corrections are added directly to the hybrid estimates 212,304 of navigation data.

The exterior sensors 12 which provide the hybridization system according to the invention with the measurements relating to the position and to the motion of the moving object can be of diverse kinds. In particular, with a satellite navigation system of GNSS type various data can be used. Either the position and the speed of the carrier are considered, both determined by the GNSS system: one then speaks of loose hybridization, or the information extracted upstream by the GNSS system is considered, namely the pseudo-distances and the pseudo-speeds (quantities arising directly from the measurement of the propagation time and the Doppler effect of the signals emitted by the satellites towards the receiver): one then speaks of tight hybridization. If the technology of the GNSS receiver so permits it is also possible to carry out so-called "ultra tight" hybridization by basing the hybridization on the I and Q data of the correlators of the GNSS per satellite axis.

The exterior sensors 12 can also consist of:
- a twin-antenna GNSS receiver which can provide a measurement of the heading of the carrier, its pitch or its roll,
- a set of at least three GNSS receivers exhibiting non-aligned antennas which deliver the three angles of heading, of roll and of pitch of the carrier,
- a radioaltimeter or a baroaltimeter which provides the altitude of the carrier,
- a magnetometer which provides the magnetic heading,
- a receiver of DME (Distance Measuring Equipment) type which delivers the distance of the carrier from a beacon,
- a receiver of VOR (Very High Frequency Omnidirectional Range) type which gives the magnetic bearing of the carrier with respect to a ground station,
- a receiver of TACAN (Tactical Air Navigation) type which embraces the properties of a DME receiver and of a VOR receiver,
- an odometer which delivers the speed of the carrier over the ground,
- an anemometric set which makes it possible to calculate the air speed of the carrier in geographical axis,
- a radar which delivers the speed of the carrier.

Finally, as introduced previously during the overview of the possible states in the state vectors, corrections can also be delivered to the exterior sensors 12 on the basis of the hybrid system according to the invention. For example, the hybridization can make it possible to identify a bias in a measurement of position determined by a satellite-based positioning system. The dispatching of corrections to these exterior sensors makes it possible to further improve the performance of the set of available position and motion measurements.

The method and the system according to the invention exhibit the principal advantage of improving the performance of the estimations of navigation and/or position data of a moving object when the inertial sensors have a non-linear behaviour.

In particular, when the defects of the inertial data exhibit amplitude steps, the method and the system according to the invention allow a wider tolerance range for the defects as well as much faster stabilization of the navigation errors.

Figure 4A:
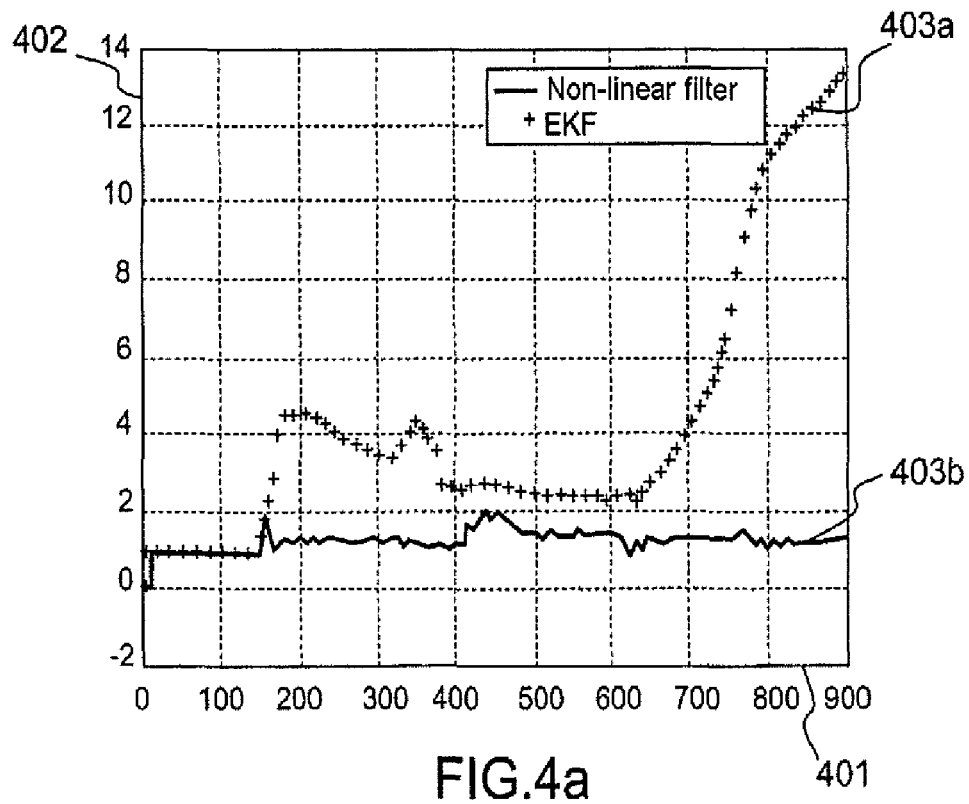
Figure 4B:
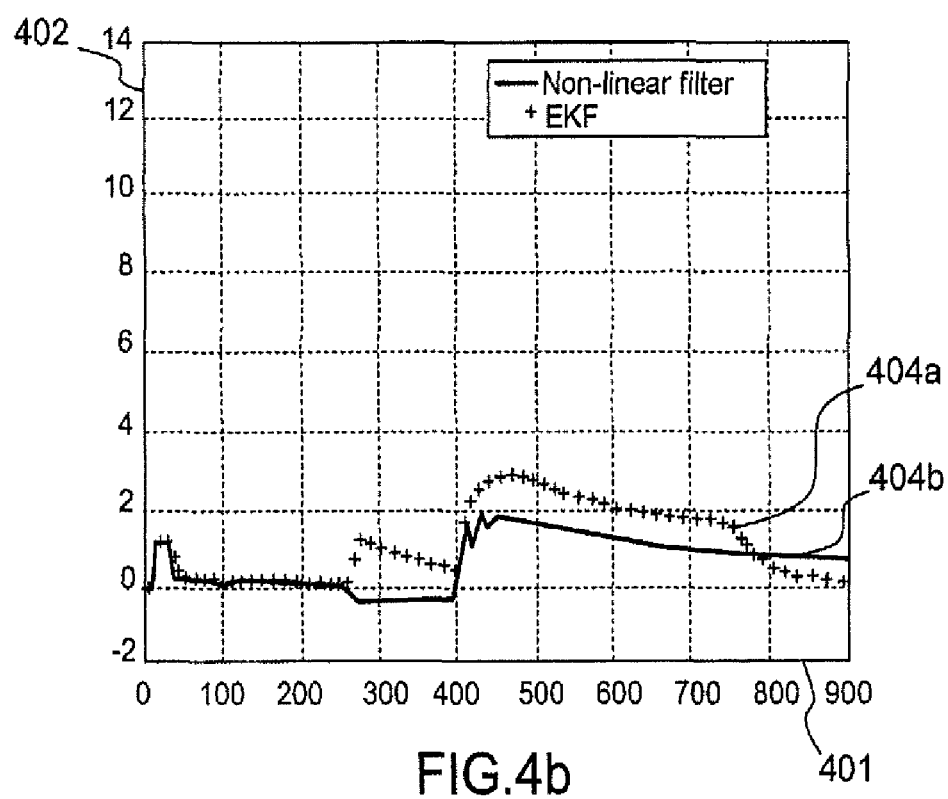
Figure 4C:
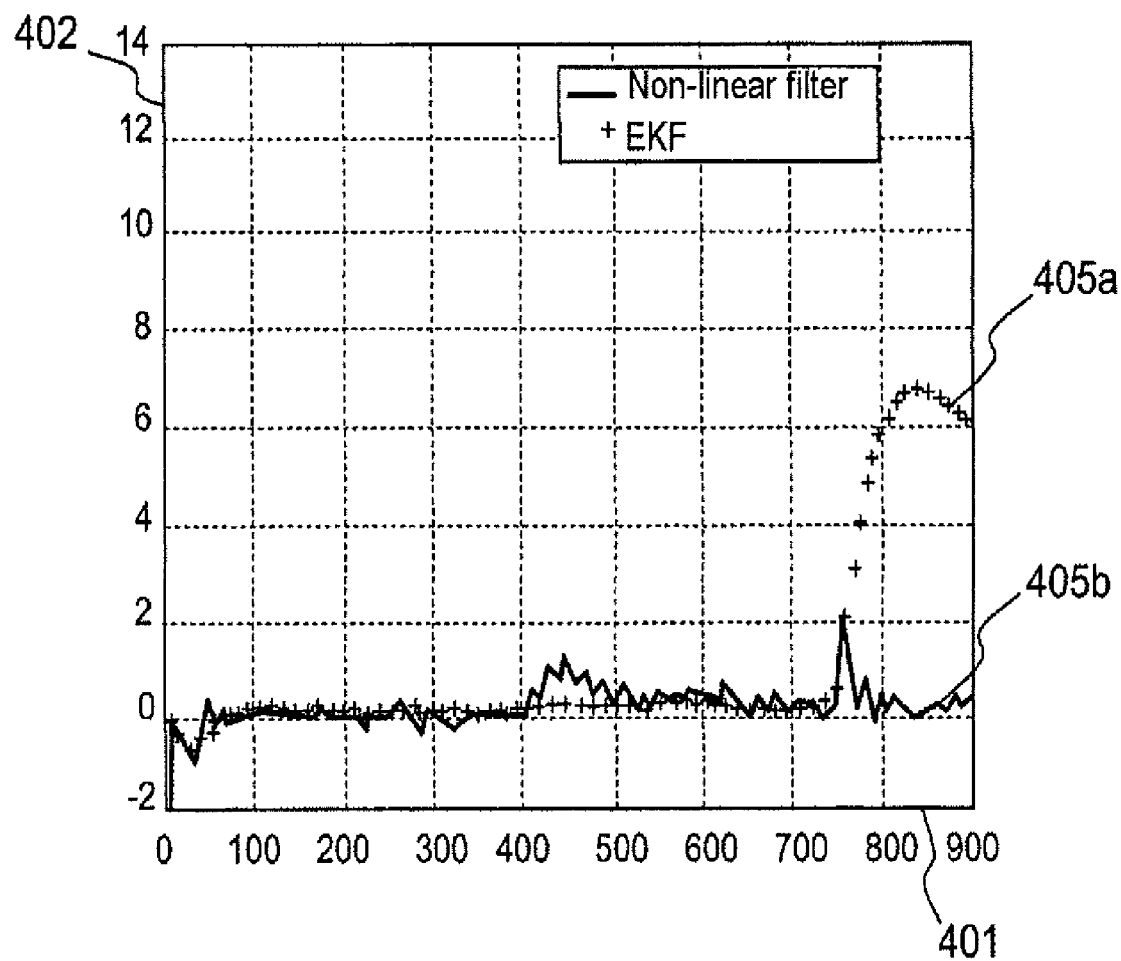

FIGS. 4a, 4b and 4c present results obtained by simulation of the hybridization method according to the invention. These simulations have been performed using a satellite-based positioning system of GNSS type and a baroaltimeter as exterior sensors. The inertial sensors considered are three gyrometers and three accelerometers. The angle increment measurements delivered by the gyrometers and speed increment measurements delivered by the accelerometers are assigned various fixed and amplitude-varying drifts or biases as well as random noise. Bias and drift steps are respectively added to the outputs of the six inertial sensors considered.

FIGS. 4a, 4b and 4c represent the errors between the reference value of the input trajectory and the value obtained as output of the hybridization method in a reference frame where the abscissa axis 401 is the time axis expressed in seconds and the ordinate axis 402 is expressed in degrees.

FIG. 4a illustrates the roll error obtained in the case of a hybridization method according to the prior art 403a and in the case of the method according to the invention 403b. Likewise FIG. 4b illustrates the pitch error in the case of the prior art 404a and of the invention 404b. Finally FIG. 4c illustrates the heading error in the case of the use of the method of the prior art 405a and of the method according to the invention 405b.

It is observed notably that the amplitude steps of the bias and drift in the measurements of the inertial sensors engender divergent behaviours in the case of the use of a conventional extended Kalman filter. The use of a multi-hypothesis filtering according to the invention exhibits the advantage of again converging rapidly subsequent to these amplitude steps. Moreover the multi-hypothesis filtering makes it possible to identify these steps in the defects of the inertial errors, its reactivity is almost instantaneous thus avoiding divergence of the filtering method.

The invention claimed is:

1. Hybrid inertial system onboard a mobile carrier, the system comprising an inertial measurements unit delivering at least one of an angle variation measurements $\Delta\theta$ and a speed variation measurements $\Delta V$, at least one platform for integrating inertial data receiving the at least one of the angle variation measurements $\Delta\theta$ and the speed variation measurements $\Delta V$ and producing instantaneous measurements of at least one of the location and of the navigation of the said mobile carrier, at least one exterior sensor delivering observation measurements of the location and/or of the navigation of the said mobile carrier and a multi-hypothesis hybridization filter receiving the said instantaneous measurements and the said observation measurements and delivering corrections to the platforms for integrating inertial data which deliver a hybrid estimation of the location and/or of the navigation of the said mobile carrier, wherein said multi-hypothesis hybridization filter implements at least the following steps:

an initialization step performing the generation of a plurality of state vectors $XP^i_0$ representative of the state of the said inertial system comprising on the one hand at least one state dedicated to the location and/or to the navigation of the said mobile carrier and on the other hand hypotheses about defects of the inertial measurements unit, an update step executing, for each of the said state vectors, the phase of readjusting an extended Kalman filtering and producing as output an updated state vector $XE^i_t$ and its associated covariance matrix $PE^i_t$, a propagation step executing, for each of the said state vectors, the phase of propagation of an extended Kalman filtering and producing as output a propagated state vector $XP^i_t$, its associated covariance matrix $PP^i_t$, and their associated likelihood $q^i_t$, a step of determining the likelihood $q^i_t$ of the said updated state vector $XE^i_t$, as a function of the comparison between the observations data and the propagated state vector, a corrections calculation step receiving the plurality of propagated state vectors $XP^i_t$, their associated covariance matrices $PP^i_t$ and their associated likelihood $q^i_t$ and producing the said inertial corrections of the errors of position and of motion of the said mobile carrier, the said corrections being delivered to the platforms for integrating inertial data.

2. Hybrid inertial system according to claim 1, wherein the likelihood $q^i_t$ of the state vector $XE^i_t$ is determined as a function of the comparison between the vector $Z_t$ of observations data and the propagated state vector $XP^i_{t-1}$ with the aid of the following relation: $q^i_t = p_{e(t)}(Z_t - H \cdot XP^i_{t-1})$, where H is an observation matrix defined with the aid of an extended Kalman filtering and $p_{e(t)}(\ )$ is a Gaussian probability function given by the following relation:

$$p_{e(t)}(Z_t - H \cdot XP^i_{t-1}) = \left(\frac{1}{2\pi}\right)^{N/2} \frac{1}{\sqrt{|R_t|}} \exp\left(-\frac{1}{2}[Z_t - H \cdot XP^i_{t-1}]^T R_t^{-1}[Z_t - H \cdot XP^i_{t-1}]\right),$$

where $R_t$ is the standard deviation of the vector $Z_t$.

3. Hybrid inertial system according to claim 2, wherein the likelihood $q^i_t$ obtained is filtered with the aid of a low-pass filter.

4. Hybrid inertial system according to claim 3, wherein said multi-hypothesis hybridization filter furthermore implements a step of updating the particles in the course of which the said hypotheses about defects of the inertial measurements unit determined during the initialization phase are adjusted as a function of an a priori knowledge of the behaviour of the said inertial measurements unit, the adjustments possibly being the deletion of one or more hypotheses and/or the generation of one or more new hypotheses.

5. Hybrid inertial system according to claim 4, wherein said exterior sensor is one of the following sensors or a combination of these sensors: a satellite navigation system, a magnetometer, a baroaltimeter, a radioaltimeter, an odometer, a DME receiver, a VOR receiver, a TACAN receiver, a radar or an anemometric set.

6. Hybrid inertial system according to claim 5, wherein said system moreover comprises means for implementing a step of calculating corrections of the observations data of the exterior sensors.

7. Hybrid inertial system according to claim 1, wherein said corrections calculation step implements the sum of the corrections obtained on the basis of each state vector hypothesis, each correction being weighted by the likelihood $q^i_t$ of the corresponding state vector.

8. Hybrid inertial system according to claim 1, wherein said system comprises an integration platform for each state vector hypothesis, the said corrections calculation step delivers an independent correction to each integration platform and the said system furthermore comprises a step of calculating filtering outputs which receives the set of hybrid estimations delivered by each of the integration platforms and calculates the sum thereof weighted by each of the associated likelihoods $q^i_t$ so as to produce a single hybrid estimation.

9. Hybrid inertial system according to claim 1, wherein said hybrid inertial system implements a so-called open-loop architecture and that the said corrections are added directly to the hybrid estimation of the location and navigation data of the said mobile carrier.

10. Method of hybridization of an inertial system onboard a mobile carrier, the system comprising an inertial measurements unit delivering at least one of an angle variation measurements $\Delta\theta$ and a speed variation measurements $\Delta V$, at least one platform for integrating inertial data receiving the at least one of the angle variation measurements $\Delta\theta$ and the speed variation measurements $\Delta V$ and producing instantaneous measurements of at least one of the location and of the navigation of the said mobile carrier, at least one exterior sensor delivering observation measurements of the location and/or of the navigation of the said mobile carrier and a multi-hypothesis hybridization filter receiving the said instantaneous measurements and the said observation measurements and delivering corrections to the platforms for integrating inertial data which deliver a hybrid estimation of the location and/or of the navigation of the said mobile carrier, wherein said multi-hypothesis hybridization filter implements at least the following steps:

an initialization step performing the generation of a plurality of state vectors $XP^i_0$ representative of the state of the said inertial system comprising on the one hand at least one state dedicated to the location and/or to the navigation of the said mobile carrier and on the other hand hypotheses about defects of the inertial measurements unit, an update step executing, for each of the said state vectors, the phase of readjusting an extended Kalman filtering and producing as output an updated state vector $XE^i_t$ and its associated covariance matrix $PE^i_t$, a propagation step executing, for each of the said state vectors, the phase of propagation of an extended Kalman filtering and producing as output a propagated state vector $XP^i_t$, its associated covariance matrix $PP^i_t$, and their associated likelihood $q^i_t$, a step of determining the likelihood $q^i_t$ of the said updated state vector $XE^i_t$, as a function of the comparison between the observations data and the propagated state vector, a corrections calculation step receiving the plurality of propagated state vectors $XP^i_t$, their associated covariance matrices $PP^i_t$ and their associated likelihood $q^i_t$ and producing the said inertial corrections of the errors of position and of motion of the said mobile carrier, the said corrections being delivered to the platforms for integrating inertial data.

11. The method of claim 10, wherein the likelihood $q^i_t$ of the state vector $XE^i_t$ is determined as a function of the comparison between the vector $Z_t$ of observations data and the propagated state vector $XP^i_{t-1}$ with the aid of the following relation: $q^i_t = p_{e(t)}(Z_t - H \cdot XP^i_{t-1})$, where H is an observation matrix defined with the aid of an extended Kalman filtering and $p_{e(t)}(\ )$ is a Gaussian probability function given by the following relation:

$$p_{e(t)}(Z_t - H \cdot XP^i_{t-1}) = \left(\frac{1}{2\pi}\right)^{N/2} \frac{1}{\sqrt{|R_t|}} \exp\left(-\frac{1}{2}[Z_t - H \cdot XP^i_{t-1}]^T R_t^{-1}[Z_t - H \cdot XP^i_{t-1}]\right),$$

where $R_t$ is the standard deviation of the vector $Z_t$.

12. The method of claim 11, wherein the likelihood $q_t^i$ obtained is filtered with the aid of a low-pass filter.

13. The method of claim 12, wherein said multi-hypothesis hybridization filter furthermore implements a step of updating the particles in the course of which the said hypotheses about defects of the inertial measurements unit determined during the initialization phase are adjusted as a function of an a priori knowledge of the behaviour of the said inertial measurements unit, the adjustments possibly being the deletion of one or more hypotheses and/or the generation of one or more new hypotheses.

14. The method of claim 13, wherein said exterior sensor is one of the following sensors or a combination of these sensors: a satellite navigation system, a magnetometer, a baroaltimeter, a radioaltimeter, an odometer, a DME receiver, a VOR receiver, a TACAN receiver, a radar or an anemometric set.

15. The method of claim 14, wherein said method moreover comprises a step of calculating corrections of the observations data of the exterior sensors.

16. Method of hybridization of an inertial system according to claim 10, wherein said corrections calculation step implements the sum of the corrections obtained on the basis of each state vector hypothesis, each correction being weighted by the likelihood q of the corresponding state vector.

17. Method of hybridization of an inertial system according to claim 10, wherein said system comprises an integration platform for each state vector hypothesis, the said corrections calculation step delivers an independent correction to each integration platform and the said system furthermore comprises a step of calculating filtering outputs which receives the set of hybrid estimations delivered by each of the integration platforms and calculates the sum thereof weighted by each of the associated likelihoods $q_t^i$ so as to produce a single hybrid estimation.

18. Method of hybridization of an inertial system according claim 10, wherein said hybrid inertial system implements a so-called open-loop architecture and that the said corrections are added directly to the hybrid estimation of the location and navigation data of the said mobile carrier.

* * * * *